Figures 1, 2:
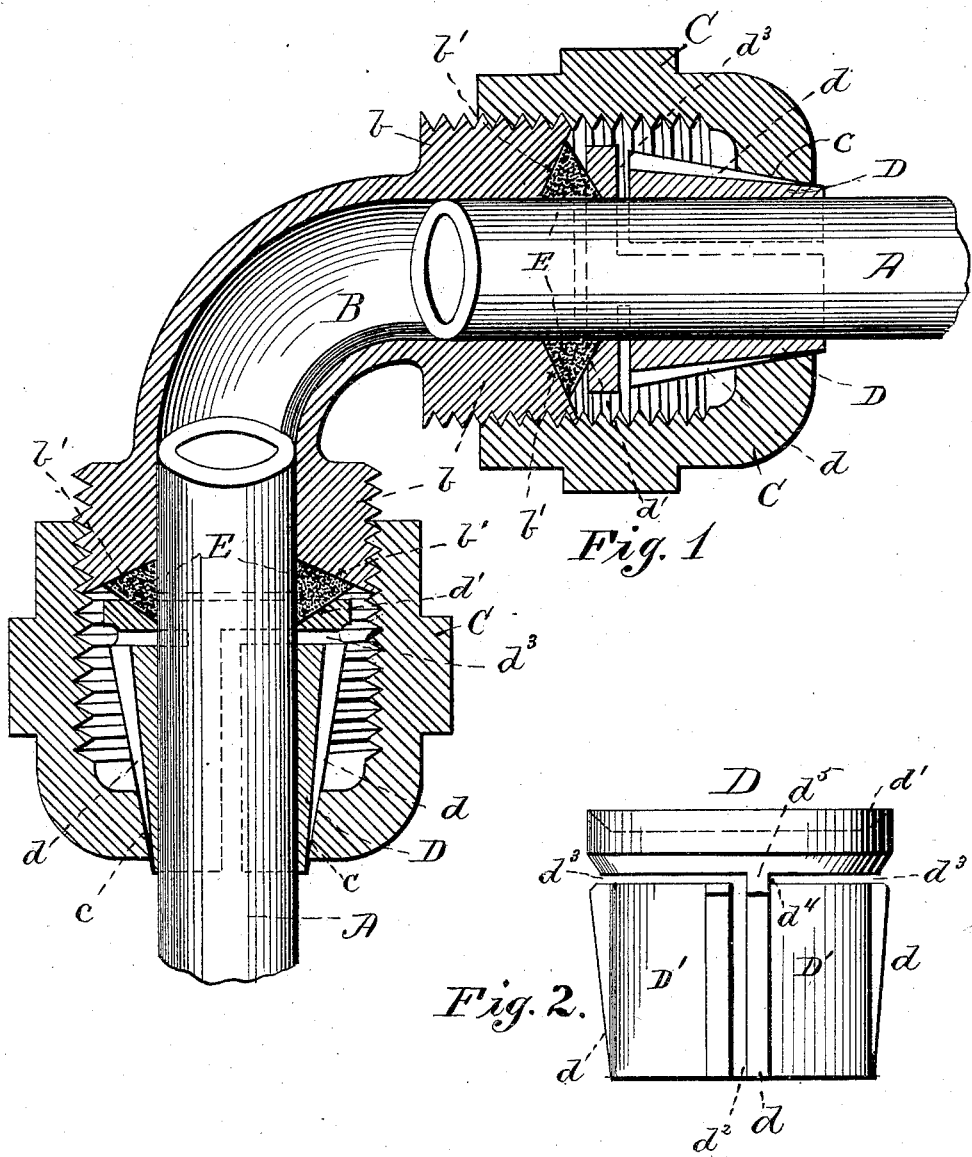

(No Model.)

I. B. POTTS.
COMBINED UNION AND ELBOW FOR PIPES.

No. 433,489. Patented Aug. 5, 1890.

Witnesses
N. B. Harris
J. M. Kenyon

Inventor
Isaac B. Potts
By Wm. H. Brereton
Attorney

UNITED STATES PATENT OFFICE.

ISAAC B. POTTS, OF COLUMBUS, OHIO.

COMBINED UNION AND ELBOW FOR PIPES.

SPECIFICATION forming part of Letters Patent No. 433,489, dated August 5, 1890.

Application filed March 5, 1890. Serial No. 342,821. (No model.)

*To all whom it may concern:*

Be it known that I, ISAAC B. POTTS, a citizen of the United States, residing at Columbus, in the county of Franklin and State of Ohio, have invented certain new and useful Improvements in Combined Union and Elbow for Pipes; and I do hereby declare the following to be a full, clear, and exact description of the invention, such as will enable others skilled in the art to which it appertains to make and use the same.

My invention relates to improvements in combined union or pipe coupling and elbow; and it consists in a novel form of clamping-ring, and in certain novel details in construction and operation of the several parts, as will be hereinafter more specifically described in the specification, and pointed out in the claims, and illustrated in the accompanying drawings.

The object of my invention is to provide a simple and effective combined union or coupling and elbow for iron, water, gas, or other pipe, which may readily be applied without skilled labor or the use of solder or cutting screw-threads; and to this end I proceed as follows, reference being had to the accompanying drawings for a better understanding of the details of construction, wherein—

Figure 1 is a central sectional elevation of a combined union and elbow constructed according to my invention; and Fig. 2 a detail view, on an enlarged scale, of the clamping-ring, showing the construction thereof.

The letters A A indicate the ends of pipe to be united; B, the bend or elbow; C, the nuts; D, the compressible rings, and E the packing-rings.

The elbow B is formed at its ends with screw-threads, as at $b\ b$, whose mouths are countersunk, as at $b'\ b'$, for the purposes as will presently appear.

The coupling-nut C is formed to fit the threaded ends $b\ b$ of elbow B, and the front end of this nut is formed with a flare or incline surface, as at $c$, that rides upon the clamping-ring D. As shown in Fig. 2, this ring D is cylindrical upon its interior, has inclined ribs, as at $d$, that taper from the rear end to near the front edge, and which front edge is countersunk, as at $d'$, Fig. 1, and in the form of a solid ring. Extending longitudinally of the part D' of the ring is a split or cut $d^2$, so that this portion of the ring is divided at one side, and transversely through the ring is a cut, as at $d^3$, that extends entirely around the ring just back of the head portion and terminates at a point $d^4$ near the inner end of the longitudinal cut $d^2$, so that the parts D and D' of the ring are only united by a narrow portion $d^5$. The object of such construction is to provide for the lateral as well as longitudinal compression of the ring, so that it will tightly clamp the pipe and yet have a solid head to receive the packing. As the nut C is screwed upon the end $b$, the bevel end $c$ of said nut rides up the incline ribs $d$ of the ring and the same forced toward the end of the elbow. At the same time the part D' of the ring is closed around the pipe, so that a secure joint is the result.

Because of the countersunk ends of the elbow and clamping-ring the packing-ring E is caused to assume a V shape, with the wide part adjacent the pipe. A tight joint is therefore the result. The clamping-ring may also be used with other forms of coupling or union and without the countersunk end; but the construction shown is preferred.

Having described my invention, what I claim, and desire to secure by Letters Patent of the United States, is—

1. The clamping-ring having solid head and body with inclined ribs, said body divided longitudinally and separated from the head, except a narrow part, substantially as described.

2. The clamping-ring having solid head, with countersunk end and body divided longitudinally and separated from the head, except at a single point, substantially as described.

3. The combination of the elbow having screw ends with countersunk mouth, clamping-ring, with solid head having countersunk mouth and body divided longitudinally and vertically, and nut and packing-ring, substantially as described and shown, for the purposes specified.

4. The combination, in a combined union and elbow, with said elbow having screw ends countersunk, of the ring having inclined ribs and countersunk mouth, and packing-ring and nut, substantially as described, for the purposes specified.

ISAAC B. POTTS.

Witnesses:
 FRANK HAYES,
 J. W. RANNEY.